United States Patent
Shen et al.

(10) Patent No.: US 11,367,313 B2
(45) Date of Patent: Jun. 21, 2022

(54) METHOD AND APPARATUS FOR RECOGNIZING BODY MOVEMENT

(71) Applicant: Baidu Online Network Technology (Beijing) Co., Ltd., Beijing (CN)

(72) Inventors: Hui Shen, Beijing (CN); Yuan Gao, Beijing (CN); Dongliang He, Beijing (CN); Xiao Liu, Beijing (CN); Xubin Li, Beijing (CN); Hao Sun, Beijing (CN); Shilei Wen, Beijing (CN); Errui Ding, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 272 days.

(21) Appl. No.: 16/509,118

(22) Filed: Jul. 11, 2019

(65) Prior Publication Data
US 2020/0042776 A1 Feb. 6, 2020

(30) Foreign Application Priority Data
Aug. 3, 2018 (CN) .......................... 201810878634.5

(51) Int. Cl.
*G06V 40/20* (2022.01)
*G06K 9/62* (2022.01)
(Continued)

(52) U.S. Cl.
CPC .......... *G06V 40/23* (2022.01); *G06K 9/6256* (2013.01); *G06V 20/46* (2022.01); *G06V 20/49* (2022.01); *G06V 40/103* (2022.01)

(58) Field of Classification Search
CPC .......... G06K 9/00342; G06K 9/00369; G06K 9/00744; G06K 9/00765; G06K 9/6256;
(Continued)

(56) References Cited

U.S. PATENT DOCUMENTS 10,699,152 B1 * 6/2020 Adam .................. G06K 9/6276
10,699,421 B1 * 6/2020 Cherevatsky .......... H04N 7/181
(Continued)

FOREIGN PATENT DOCUMENTS

CN        105787439 A      7/2016
CN        107832708 A      3/2018
(Continued)

OTHER PUBLICATIONS

Wang, et al., "Temporal Segment Networks: Towards Good Practices for Deep Action Recognition", arXiv:1608.00859v1 [cs.CV] Aug. 2, 2016, pp. 1-16 (XP055551834).
(Continued)

*Primary Examiner* — Qun Shen
(74) *Attorney, Agent, or Firm* — Knobbe, Martens, Olson & Bear LLP

(57) ABSTRACT

Embodiments of the present disclosure disclose a method and apparatus for recognizing a body movement. A specific embodiment of the method includes: sampling an input to-be-recognized video to obtain a sampled image frame sequence of the to-be-recognized video; performing key point detection on the sampled image frame sequence by using a trained body key point detection model, to obtain a body key point position heat map of each sampled image frame in the sampled image frame sequence, the body key point position heat map being used to represent a probability feature of a position of a preset body key point; and inputting body key point position heat maps of the sampled image frame sequence into a trained movement classification model to perform classification, to obtain a body movement recognition result corresponding to the to-be-recognized video.

20 Claims, 7 Drawing Sheets

(51) Int. Cl.
*G06V 20/40* (2022.01)
*G06V 40/10* (2022.01)

(58) Field of Classification Search
CPC ........ G06V 40/23; G06V 20/49; G06V 20/46; G06V 40/103
See application file for complete search history.

(56) References Cited

U.S. PATENT DOCUMENTS

| | | | |
|---|---|---|---|
| 10,878,219 B2* | 12/2020 | Zhou | G06N 3/0445 |
| 2006/0204040 A1* | 9/2006 | Freeman | G06T 7/246 |
| | | | 382/218 |
| 2012/0214594 A1* | 8/2012 | Kirovski | G06K 9/00355 |
| | | | 463/36 |
| 2013/0129193 A1* | 5/2013 | Wang | G06T 7/593 |
| | | | 382/154 |
| 2016/0124513 A1* | 5/2016 | Dal Zot | G06F 3/011 |
| | | | 715/863 |
| 2016/0171127 A1 | 6/2016 | Gannon | |
| 2017/0116461 A1* | 4/2017 | Kakita | G06V 20/54 |
| 2018/0296281 A1* | 10/2018 | Yeung | G06K 9/6271 |
| 2019/0080176 A1* | 3/2019 | Lan | G06N 3/0454 |

FOREIGN PATENT DOCUMENTS

| | | |
|---|---|---|
| CN | 107992836 A | 5/2018 |
| WO | 2017/176511 A1 | 10/2017 |

OTHER PUBLICATIONS

Oved, Real-time Human Pose Estimation in the Browser with TensorFlow.js, http.//web.archive.org/web20180508125909/https://medium.com/sensorflow/real-time-human-pose-estimation-in-the-browser-with-tensorflow-js, Nov. 5, 2019, pp. 1-15 (XP055639086).

Feng, et al., Learning effective gait features using LSTM, 2016 23$^{rd}$ International Conference on Pattern Recognition (ICPR), IEEE, pp. 325-330 (2016).

* cited by examiner

METHOD AND APPARATUS FOR RECOGNIZING BODY MOVEMENT

CROSS-REFERENCE TO RELATED APPLICATIONS

This application claims priority to Chinese Patent Application No. 201810878634.5, filed with the China National Intellectual Property Administration (CNIPA) on Aug. 3, 2018, the content of which is incorporated herein by reference in its entirety.

TECHNICAL FIELD

Embodiments of the present disclosure relate to the field of computer technology, specifically to the field of image processing technology, and more specifically to a method and apparatus for recognizing a body movement.

BACKGROUND

Image processing reflects machines' understanding on spatial objects, and is an important technology in the artificial intelligence technology. At present, the processing method based on static images has made great progress in tasks such as image classification and target tracking. However, as for processing of a video formed by consecutive image frames, the processing complexity is high since the information in time dimension is involved in addition to the information in spatial dimension.

Image processing may be specifically applied to the understanding on body movement behaviors. In the body movement recognition technology based on the image processing technology, a body movement image is usually acquired using an imaging device, and then static classification and recognition is performed on the body movement image. Generally, a body movement is a behavior that is constrained by the coordination relationship between body structures and is consecutive in time. Each movement has context information in the time dimension, and It is difficult for the movement recognition technology based on static image classification and recognition to use such information.

SUMMARY

Embodiments of the present disclosure provide a method and apparatus for recognizing a body movement.

In a first aspect, the embodiments of the present disclosure provide a method for recognizing a body movement, including: sampling an input to-be-recognized video to obtain a sampled image frame sequence of the to-be-recognized video; performing key point detection on the sampled image frame sequence by using a trained body key point detection model, to obtain a body key point position heat map of each sampled image frame in the sampled image frame sequence, the body key point position heat map being used to represent a probability feature of a position of a preset body key point; and inputting body key point position heat maps of the sampled image frame sequence into a trained movement classification model to perform classification, to obtain a body movement recognition result corresponding to the to-be-recognized video.

In some embodiments, the sampling an input to-be-recognized video to obtain a sampled image frame sequence of the to-be-recognized vide, includes: dividing the input to-be-recognized video into a plurality of video segments, extracting one image frame from each video segment as a sampled image frame of the video segment, and generating the sampled image frame sequence of the to-be-recognized video based on respective sampled image frames of the video segments.

In some embodiments, the inputting the body key point position heat maps of the sampled image frame sequence into a trained movement classification model to perform classification, to obtain a body movement recognition result corresponding to the to-be-recognized video, includes: inputting body key point position heat maps of the sampled image frames in the respective sampled image frame sequence into an image feature extraction network of the trained movement classification model, to extract body key point position feature maps of the sampled image frame sequence; inputting the body key point position feature maps of the sampled image frame sequence into a movement feature extraction network of the trained movement classification model, to obtain a movement feature corresponding to the sampled image frame sequence; and performing, based on the movement feature corresponding to the sampled image frame sequence, classification on a body movement indicated by the to-be-recognized video corresponding to the sampled image frame sequence, to obtain the body movement recognition result of the to-be-recognized video.

In some embodiments, the method further includes: training to obtain the body key point detection model based on a labeled sample image set, includes: acquiring a sample image set, where the sample image set includes a sample image and labeling information of a body key point position in the sample image; generating, based on a labeled body key point position in the sample image, a probability heat map with a probability decreasing progressively from the body key point position as a center toward peripheries of the body key point position, as a labeling result of a body key point position heat map of the sample image; and inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

In some embodiments, the method further includes: training to obtain the movement classification model based on a labeled sample video set, includes: acquiring a sample video set, where the sample video set includes a sample video and labeling information of a body movement indicated by the sample video; sampling the sample video to obtain a sample sampled image frame sequence of the sample video; performing key point detection on the sample sampled image frame sequence using the trained body key point detection model, to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

In some embodiments, the training to obtain the movement classification model based on a labeled sample video set, further includes: extracting a body region from image frames of the sample video, performing a zoom operation of a preset zoom factor and/or a translation operation of a preset translation distance on the body region to generate a simulated sample video, and acquiring labeling information of a body movement indicated by the simulated sample video and adding the simulated sample video to the sample video set.

In a second aspect, the embodiments of the present disclosure provide an apparatus for recognizing a body movement, including: a sampling unit, configured to sample an input to-be-recognized video to obtain a sampled image frame sequence of the to-be-recognized video; a detection unit, configured to perform key point detection on the sampled image frame sequence by using a trained body key point detection model, to obtain a body key point position heat map of each sampled image frame in the sampled image frame sequence, the body key point position heat map being used to represent a probability feature of a position of a preset body key point; and a recognition unit, configured to input body key point position heat maps of the sampled image frame sequence into a trained movement classification model to perform classification, to obtain a body movement recognition result corresponding to the to-be-recognized video.

In some embodiments, the sampling unit is further configured to sample an input to-be-recognized video to obtain a sampled image frame sequence of the to-be-recognized video as follows: dividing the input to-be-recognized video into a plurality of video segments, extracting one image frame from each video segment as a sampled image frame of the video segment, and generating the sampled image frame sequence of the to-be-recognized video based on respective sampled image frames of the video segments.

In some embodiments, the recognition unit is further configured to obtain a body movement recognition result corresponding to the to-be-recognized video as follows: inputting body key point position heat maps of the respective sampled image frames in the sampled image frame sequence into an image feature extraction network of the trained movement classification model, to extract body key point position feature maps of the sampled image frame sequence; inputting the body key point position feature maps of the sampled image frame sequence into a movement feature extraction network of the trained movement classification model to obtain a movement feature corresponding to the sampled image frame sequence; and performing, based on the movement feature corresponding to the sampled image frame sequence, classification on a body movement indicated by the to-be-recognized video corresponding to the sampled image frame sequence, to obtain the body movement recognition result of the to-be-recognized video.

In some embodiments, the apparatus further includes: a first training unit, configured to train to obtain the body key point detection model based on a labeled sample image set as follows: acquiring a sample image set, where the sample image set includes a sample image and labeling information of a body key point position in the sample image; generating, based on a labeled body key point position in the sample image, a probability heat map with a probability decreasing progressively from the body key point position as a center toward peripheries of the body key point position, as a labeling result of a body key point position heat map of the sample image; and inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

In some embodiments, the apparatus further includes: a second training unit, configured to train to obtain the movement classification model based on a labeled sample video set as follows: acquiring a sample video set, where the sample video set includes a sample video and labeling information of a body movement indicated by the sample video; sampling the sample video to obtain a sample sampled image frame sequence of the sample video; performing key point detection on the sample sampled image frame sequence using the trained body key point detection model to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

In some embodiments, the second training unit is further configured to: extract a body region from image frames of the sample video, perform a zoom operation of a preset zoom factor and/or a translation operation of a preset translation distance on the body region to generate a simulated sample video, and acquire labeling information of a body movement indicated by the simulated sample video and add the simulated sample video to the sample video set.

In a third aspect, the embodiments of the present disclosure provide an electronic device, including: one or more processors; and a storage apparatus, storing one or more programs thereon, the one or more programs, when executed by the one or more processors, cause the one or more processors to implement the method for recognizing a body movement as provided by the first aspect.

In a fourth aspect, the embodiments of the present disclosure provide a computer readable medium, storing a computer program thereon, the program, when executed by a processor, implements the method for recognizing a body movement as provided by the first aspect.

The method and apparatus for recognizing a body movement provided by the embodiments of the present disclosure, sample an input to-be-recognized video to obtain a sampled image frame sequence of the to-be-recognized video, then perform key point detection on the sampled image frame sequence by using a trained body key point detection model, to obtain a body key point position heat map of each sampled image frame in the sampled image frame sequence, the body key point position heat map being used to represent a probability feature of a position of a preset body key point, and input body key point position heat maps of the sampled image frame sequence into a trained movement classification model, to perform classification to obtain a body movement corresponding to the to-be-recognized video, thereby realizing a movement recognition using the coordination relationship between body key points in a to-be-recognized video and the time continuity characteristic of body movements, which is beneficial to improving the recognition accuracy.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
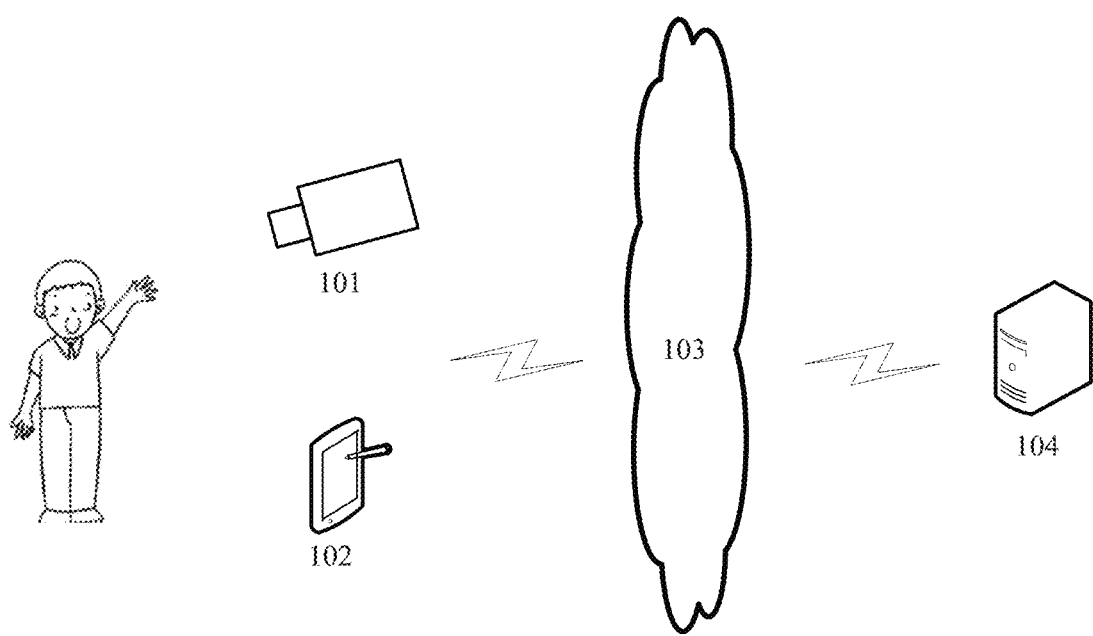
FIG. 1 is an exemplary system architecture diagram to which an embodiment of the present disclosure may be applied.

FIG. 1 illustrates an exemplary system architecture 100 to which a method for recognizing a body movement or an apparatus for recognizing a body movement of the present disclosure may be applied.

As shown in FIG. 1, the system architecture 100 may include terminal devices 101, 102, a network 103, and a server 104. The network 103 is configured to provide a communication link medium between the terminal devices 101, 102 and the server 104. The network 103 may include a variety of connections, such as wired, wireless communication links, or optic fibers.

The terminal devices 101 and 102 may be various electronic devices having imaging functions and supporting Internet access, or may be dedicated camera devices, such as surveillance cameras, in-vehicle cameras, or other electronic devices having camera functions, such as smart phones, tablet computers, or laptops.

The terminal devices 101, 102 may image a person within imaging ranges thereof, and encode and store a plurality of images acquired over a period of time in a video form.

The server 104 may be a server that processes images or videos acquired by a terminal device. The server 104 may be connected to the terminal devices 101 and 102, and receive images or videos transmitted by the terminal devices 101 and 102, perform feature extraction, target recognition, and the like on the images or videos transmitted by the terminal devices 101 and 102, and feed back processing results to the terminal devices 101, 102.

It should be noted that the method for recognizing a body movement provided by the embodiments of the present disclosure may be executed by the server 104. Accordingly, the apparatus for recognizing a body movement may be provided in the server 104.

It should be noted that the server may be hardware or software. When the server is hardware, it may be implemented as a distributed server cluster composed of a plurality of servers, or as a single server. When the server is software, it may be implemented as a plurality of software or software modules (e.g., a plurality of software modules for providing distributed services), or as a single software or software module, which is not specifically limited here.

When the terminal device includes a component (for example, a processor such as a GPU) for performing a physical operation, the method for recognizing a body movement provided by the embodiments of the present disclosure may also be performed by the terminal devices 101, 102. Accordingly, the apparatus for recognizing a body movement may be provided in the terminal devices 101, 102.

It should be noted that the numbers of the terminal device, the network and the server in FIG. 1 are merely illustrative. Any number of terminal device, network and server may be provided based on the implementation requirements.

Figure 2:
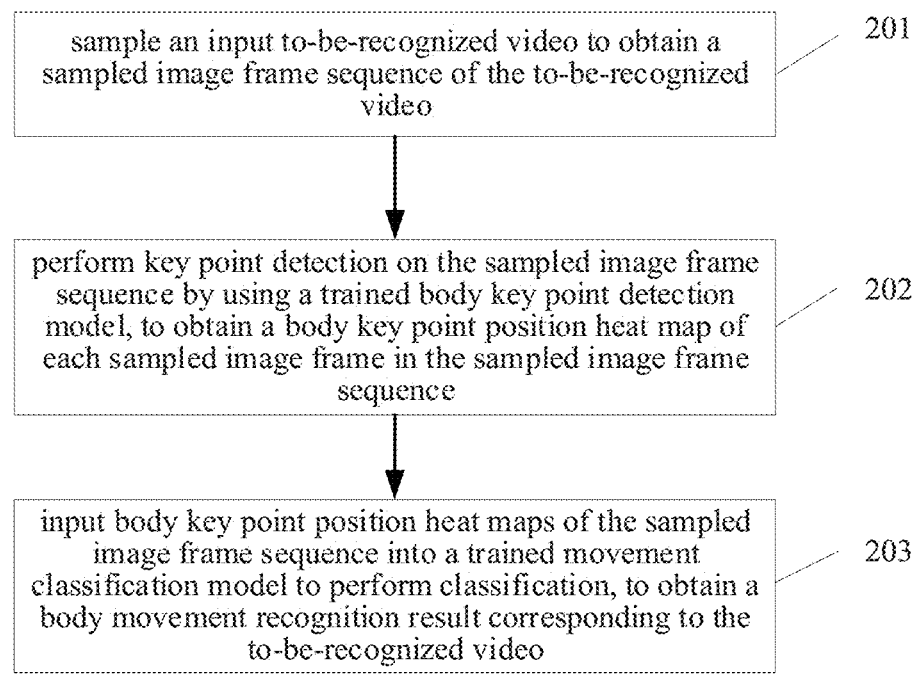
FIG. 2 is a flowchart of an embodiment of a method for recognizing a body movement according to the present disclosure.

With further reference to FIG. 2, a flow 200 of an embodiment of a method for recognizing a body movement according to the present disclosure is illustrated. The method for recognizing a body movement includes the following steps:

Step 201, sampling an input to-be-recognized video to obtain a sampled image frame sequence of the to-be-recognized video.

In the present embodiment, an executing body of the method for recognizing a body movement may acquire an input to-be-recognized video, and the to-be-recognized video may be a to-be-recognized video formed by continuously imaging a scenario including a person, and may include a plurality of image frames which are consecutive in time.

In practice, the executing body may acquire the to-be-recognized video by establishing a connection with the electronic device that acquires the to-be-recognized video, or may read the to-be-recognized video from a local memory. Alternatively, the executing body may acquire a specified to-be-recognized video in response to receiving a body movement recognition instruction, that is, the to-be-recognized video may be read into the executing body after the body movement recognition instruction is issued. For example, in an actual scenario, the user may specify a certain segment of a to-be-recognized video for body movement recognition, and then the specified to-be-recognized video may be read and may be served as the input to-be-recognized video.

After the input to-be-recognized video is acquired, sampling may be performed on the to-be-recognized video in the time dimension to obtain a sampled image frame sequence of the to-be-recognized video. Certain image frames in the image frames included in the to-be-recognized video may be selected as sampled image frames, and combined into a sampled image frame sequence according to the generation time of the sampled image frames.

In some alternative implementations of the present embodiment, a predetermined number of sampled image frames may be randomly extracted from the to-be-recognized video by random sampling.

In some alternative implementations of the present embodiment, the TSN (Temporal Segment Network) algorithm may be used to segment and sample the to-be-recognized video. Specifically, the input to-be-recognized video may be divided into a plurality of video segments, one image frame may be extracted from each video segment as a sampled image frame of the video segment, and then the sampled image frame sequence of the to-be-recognized video may be generated based on the sampled image frames of the video segments. For example, the input to-be-recognized video may be evenly divided into k video segments, one image frame may be randomly extracted from each video segment or one image frame at the start time, the middle time, or the end time of each video segment may be extracted, and used as the sampled image frame of the video segment. Then, the sampled image frames of the video segments are sorted according to the generation time to generate the sampled image frame sequence, and the generated sampled image frame sequence includes k sample image frames.

In the present embodiment, other existing sampling methods may also be used to sample the images in the to-be-recognized video, which is not specifically limited in the present disclosure.

Step 202, performing key point detection on the sampled image frame sequence by using a trained body key point detection model, to obtain a body key point position heat map of each sampled image frame in the sampled image frame sequence.

In the present embodiment, the sampled image frame sequence may be input into a trained body key point detection model. The body key point detection model may perform body key point position detection on each sampled image frame in the input sampled image frame sequence, to generate a body key point position heat map of each sampled image frame. The body key point position heat map is used to represent a probability feature of the position of a preset body key point. In the body key point position heat map, the pixel value of each pixel point indicates the probability of the body key point being located at the corresponding position of the pixel point.

The body key point may be a key node of the body structure that affects the position and posture of the body, for example, may be a body joint point. The preset body key point may be a preset body key point, and may include, for example, a joint point such as a shoulder joint, an elbow joint, a wrist joint, a hip joint, a knee joint, or an ankle joint.

The body key point detection model may perform feature extraction and key point positioning on each input sampled image frame, to detect the probabilities of the preset body key point in different positions in the image, and then generate the body key point position heat map based on the detected probabilities of the body key point in different positions.

Alternatively, the body key point position heat map may be a multi-channel image, and each channel corresponds to one preset body key point. For example, if N body key points are preset, the body key point detection model may detect the positions of the N body key points in each sampled image frame to obtain a feature map including N channels, and the feature map of each channel is a probability feature map of the position of one body key point.

The body key point detection model may be a model constructed based on a deep neural network, for example, a model constructed based on CNN (Convolutional Neural Network) or RNN (Recurrent Neural Network). The body key point detection model may be obtained by training in advance using sample data. The sample data may include images labeled with positions of body key points. During the training process, parameters of the body key point detection model may be adjusted, so that the difference between a detection result of the body key point detection model for the image labeled with positions of body key points and the labeled positions of body key points is continuously reduced.

Step 203, inputting the body key point position heat map of the sampled image frame sequence into a trained movement classification model to perform classification to obtain a body movement recognition result corresponding to the to-be-recognized video.

In the present embodiment, the body key point position heat map of the sampled image frame sequence obtained in step 202 may be input into a trained movement classification model, and the trained movement classification model may perform classification on a body movement indicated by the sampled image frame sequence based on the body key point position heat map, to obtain recognition result of a body movement in the to-be-recognized video corresponding to the sampled image frame sequence.

The trained movement classification model may be a model constructed based on a deep learning network, for example, a neural network constructed based on CNN or RNN. The trained movement classification model may be obtained by training based on sample data. Here, the sample data may include an image frame sequence extracted from a video serving as a sample and labeling information of a body movement corresponding to the image frame sequence. In practice, the body movement corresponding to each segment of video in the sample data may be labeled, thereby generating labeling information of the image frame sequence of the segment of video. The body key point position heat map of each image frame in the sample data may be extracted, and the extracted body key point position heat map is input into a to-be-trained movement classification model for movement classification. During the training process, parameters of the to-be-trained movement classification model may be iteratively adjusted, such that the difference between a result of the classification performed by the movement classification model on the image frame sequence in the sample data and the corresponding labeling information is continuously reduced.

The method for recognizing a body movement in the above embodiment of the present disclosure samples an input to-be-recognized video to obtain a sampled image frame sequence of the to-be-recognized video, then performs key point detection on the sampled image frame sequence by using a trained body key point detection model, to obtain a body key point position heat map of each sampled image frame in the sampled image frame sequence, the body key point position heat map being used to represent a probability feature of a position of a preset body key point, and inputs the body key point position heat map of the sampled image frame sequence into a trained movement classification model to perform classification, to obtain a body movement corresponding to the to-be-recognized video, thereby realizing a movement recognition using the coordination relationship of body key points in a to-be-recognized video and the time continuity characteristic of body movements, which is beneficial to improving the recognition accuracy.

An exemplary application scenario of the embodiments of the present disclosure is: when an unmanned vehicle is travelling, a video of command movements from a traffic police may be acquired by an in-vehicle camera, the video may be used for movement recognition locally or in the cloud. The video may be sampled to obtain a sampled image frame sequence, then a body key point position heat map of the sampled image frame sequence is detected by using the body key point detection model. Then, the body key point position heat map of the sampled image frame sequence is input into a trained movement classification model to obtain a recognition result of the command movement from the traffic police in the video. Further, the unmanned vehicle may perform a corresponding operation according to the recognition result, such as stopping by the side, or slowing down.

In some embodiments, the movement classification model may be constructed by a plurality of neural networks that implement different functions, for example, may include an image feature extraction network and an movement feature extraction network. The image feature extraction network and the movement feature extraction network may each be a multi-layer neural network. At this time, in the above step 203, the image feature extraction network and the movement feature extraction network may be sequentially used to extract features of the body key point position heat map of the input image frame sequence, and recognize the body movement based on the extracted features.

Figure 3:
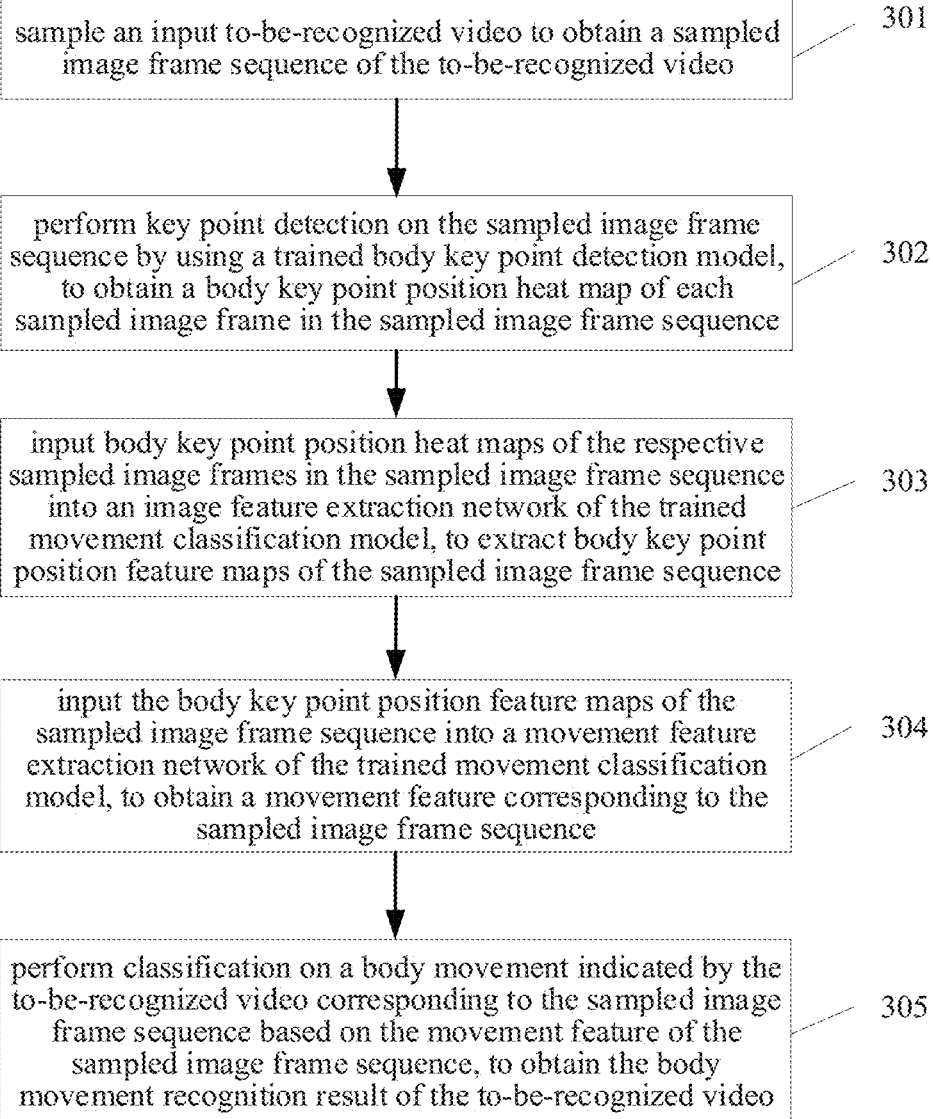
FIG. 3 is a flowchart of another embodiment of the method for recognizing a body movement according to the present disclosure.

With further reference to FIG. 3, a flowchart of another embodiment of the method for recognizing a body movement according to the present disclosure is illustrated. As shown in FIG. 3, the flow 300 of the method for recognizing a body movement of the present embodiment includes the following steps:

Step 301, sampling an input to-be-recognized video to obtain a sampled image frame sequence of the to-be-recognized video.

In the present embodiment, the executing body of the method for recognizing a body movement may acquire an input to-be-recognized video, and the to-be-recognized video may be a to-be-recognized video formed by continuously imaging a scenario including a person, and may include a plurality of image frames being consecutive in time.

After the input to-be-recognized video is acquired, sampling may be performed on the to-be-recognized video in the time dimension to obtain a sampled image frame sequence of the to-be-recognized video. Certain image frames in the image frames included in the to-be-recognized video may be selected as sampled image frames, and combined into a sampled image frame sequence according to the generation time of the sampled image frames.

In some alternative implementations of the present embodiment, a predetermined number of sampled image frames may be randomly extracted from the to-be-recognized video by random sampling. In some other alternative implementations of the present embodiment, the input to-be-recognized video may be divided into a plurality of video segments, one image frame may be extracted from each video segment as a sampled image frame of the video segment, and then the sampled image frame sequence of the to-be-recognized video may be generated based on the respective sampled image frames of the video segments.

Step 302, performing key point detection on the sampled image frame sequence by using a trained body key point detection model, to obtain a body key point position heat map of each sampled image frame in the sampled image frame sequence.

In the present embodiment, the sampled image frame sequence may be input into a trained body key point detection model. The body key point detection model may perform body key point position detection on each sampled image frame, to generate a body key point position heat map of each sampled image frame. The body key point position heat map is used to represent a probability feature of the position of a preset body key point. In the body key point position heat map, the pixel value of each pixel point indicates the probability of the key point being located at the corresponding position of the pixel point.

The body key point may be a key node of the body structure that affects the position and posture of the body, for example, may be a body joint point. The preset body key point may be a preset body joint point, and may include, for example, a joint point such as a shoulder joint, an elbow joint, a wrist joint, a hip joint, a knee joint, or an ankle joint. The body key point detection model may detect the probabilities of the preset body key point in different positions in the image, and then generate the body key point position heat map based on the detected probabilities of the body key point in different positions.

In the present embodiment, the step 301 and the step 302 are respectively corresponding to the step 201 and the step 202 of the foregoing embodiment, and the specific implementations of the step 301 and the step 302 are also consistent with the specific implementations of the foregoing steps 201 and 202, and detailed description thereof will be omitted.

Step 303, inputting body key point position heat maps of the respective sampled image frames in the sampled image frame sequence into an image feature extraction network of the trained movement classification model, to extract body key point position feature maps of the sampled image frame sequence.

In the present embodiment, body key point position heat maps of the sampled image frames in the sampled image frame sequence obtained in step 302 may be first input into an image feature extraction network of the trained movement classification model. The image feature extraction network may be constructed based on a convolutional neural network, and may include a plurality of convolutional layers. After image features of the body key point position heat map of each sampled image frame in the sampled image frame sequence are extracted by the plurality of convolutional layers, a plurality of feature images may be obtained, that is, a body key point position feature map of each sampled image frame is obtained. Then, after image feature extraction is performed on all the sampled image frames in the sampled image frame sequence, the body key point position feature maps of the sampled image frame sequence may be obtained.

Alternatively, since the body key point position heat map inputted into the movement classification model only contains position information of the key points, and is independent of other body structures of the body, a smaller number of convolution layers (for example, 3 convolution layers) may be set for the image feature extraction network. In this way, the calculation speed may be improved while ensuring the accuracy of the model.

Step 304, inputting the body key point position feature map of the sampled image frame sequence into a movement feature extraction network of the trained movement classification model, to obtain a movement feature corresponding to the sampled image frame sequence.

After the body key point position feature maps of the respective sampled image frames are extracted, the body key point position feature maps of a given sampled image frame sequence may be input into a movement feature extraction network of the trained movement classification model, thereby to extract a movement feature corresponding to the sampled image frame sequence. Here, the movement feature extraction network may be a network for processing serialized information, and may be, for example, an LSTM (Long Short-Term Memory) network. When predicting the output of the body key point position feature map of a current sampled image frame, the LSTM network may predict by using information of the body key point position feature maps of all the previous sampled image frames, so that the time continuity of the body movement may be used to extract the movement feature. After the body key point position feature maps are sequentially input into the movement feature extraction network according to the order of the corresponding sampled image frame sequence, the movement feature corresponding to the sampled image frame sequence may be extracted. The movement feature may be represented in the form of a feature vector.

Step 305, performing, based on the movement feature corresponding to the sampled image frame sequence, classification on a body movement indicated by the to-be-recognized video corresponding to the sampled image frame sequence, to obtain the body movement recognition result of the to-be-recognized video.

Subsequently, the extracted movement feature may be input into a full connection layer and a classification layer of the trained movement classification model for classification. Each node in the full connection layer is connected with all the nodes in the previous layer of the movement classification model (i.e., the last layer of the movement feature extraction network), and the classification layer may be a classifier based on a softmax function or a classifier based on a sigmod function. After classifying by the full connection layer and the classification layer, the recognition result of the body movement may be obtained, and the body movement indicated by the to-be-recognized video input in step 301 may be determined.

Figure 4:
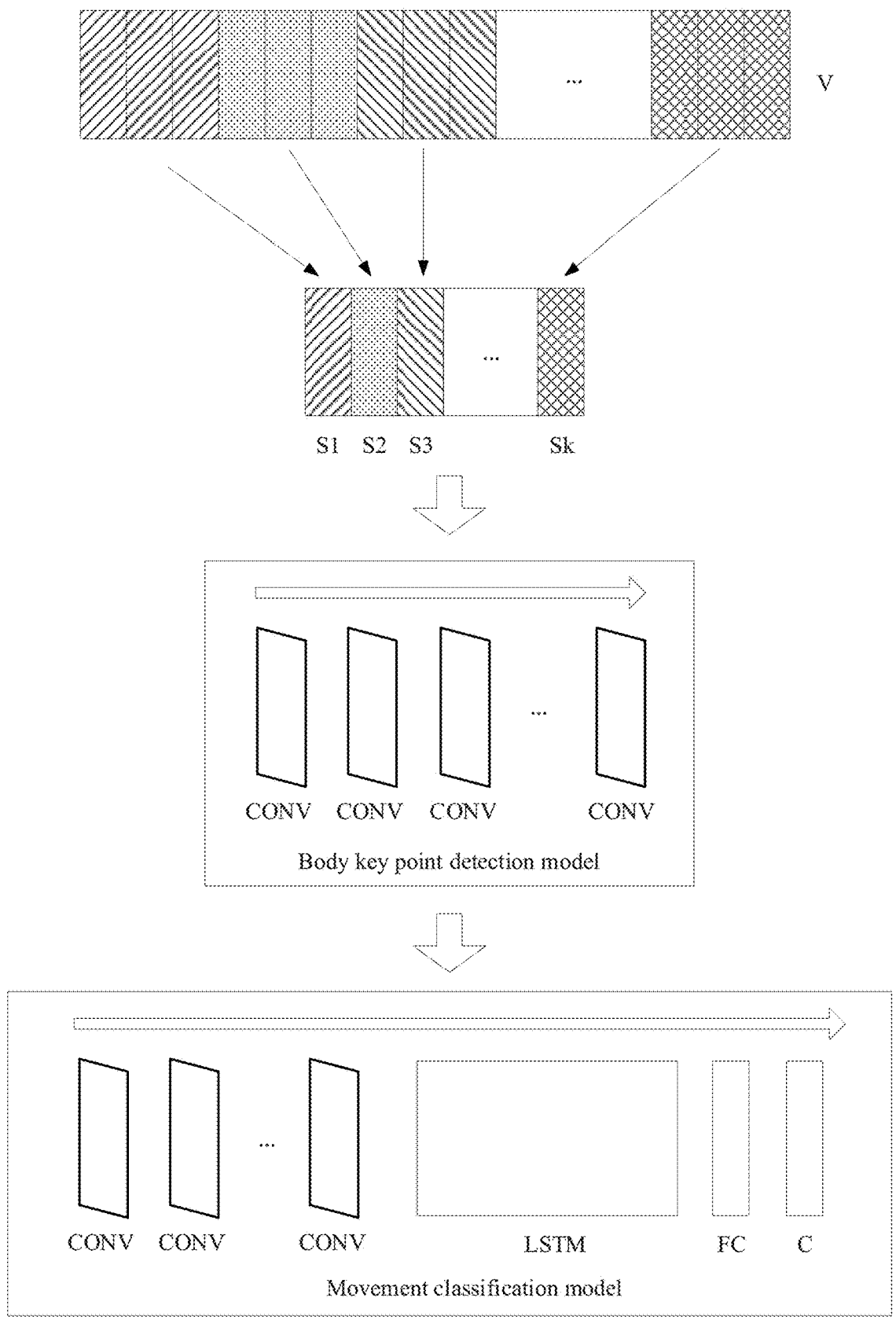
FIG. 4 is a schematic diagram of a principle of the method for recognizing a body movement shown in FIG. 3.

With reference to FIG. 4, a schematic diagram of a principle of the method for recognizing a body movement shown in FIG. 3 is illustrated. As shown in FIG. 4, first, a to-be-recognized video V including a plurality of consecutive image frames may be sampled, to obtain a sampled image frame sequence S1, S2, S3, . . . , Sk, where k is a positive integer. For example, the to-be-recognized video may be divided into a plurality of video segments, and one frame of image may be extracted from each video segment as a sampled image frame. The sampled image frame sequence S1, S2, S3, . . . , Sk may then be input into a trained body key point detection model to obtain a body key point position heat map of each sampled image frame in the sampled image frame sequence S1, S2, S3, . . . , Sk. The trained body key point detection model may be a convolutional neural network including a plurality of convolutional layers CONV. Then, the body key point position heat maps of the respective sampled image frames in the sampled image frame sequence may be input into a trained movement classification model for processing. The movement classification model may include an image feature extraction network formed by a plurality of convolutional layers CONV, an LSTM network-based movement feature extraction network, a full connection layer FC, and a classification layer C. After processing by the image feature extraction network, the movement feature extraction network, the full connection layer FC, and the classification layer C in the movement classification model, a movement recognition result may be obtained.

The method for recognizing a body movement provided by the embodiment shown in FIG. 3 and FIG. 4, extracts the image feature of each sampled image frame by using the image feature extraction network, extracts the movement feature including spatial dimension and time dimension feature information using the movement feature extraction network, and performs movement recognition based on the movement feature. The method can accurately extract the position features of the body key points and the potential movement features of the movement formed by coordination of different body key points, and the time continuity characteristic included in the to-be-recognized video is used to perform movement recognition, which may further improve the recognition accuracy.

In the embodiments described above in connection with FIGS. 2, 3, and 4, both the body key point detection model and the movement classification model may be obtained by training with sample data. In some alternative implementations of the foregoing embodiments, the body movement recognition model may further include: a step of training to obtain the body key point detection model based on a labeled sample image set and/or a step of training to obtain the movement classification model based on a labeled sample video set.

Figure 5:
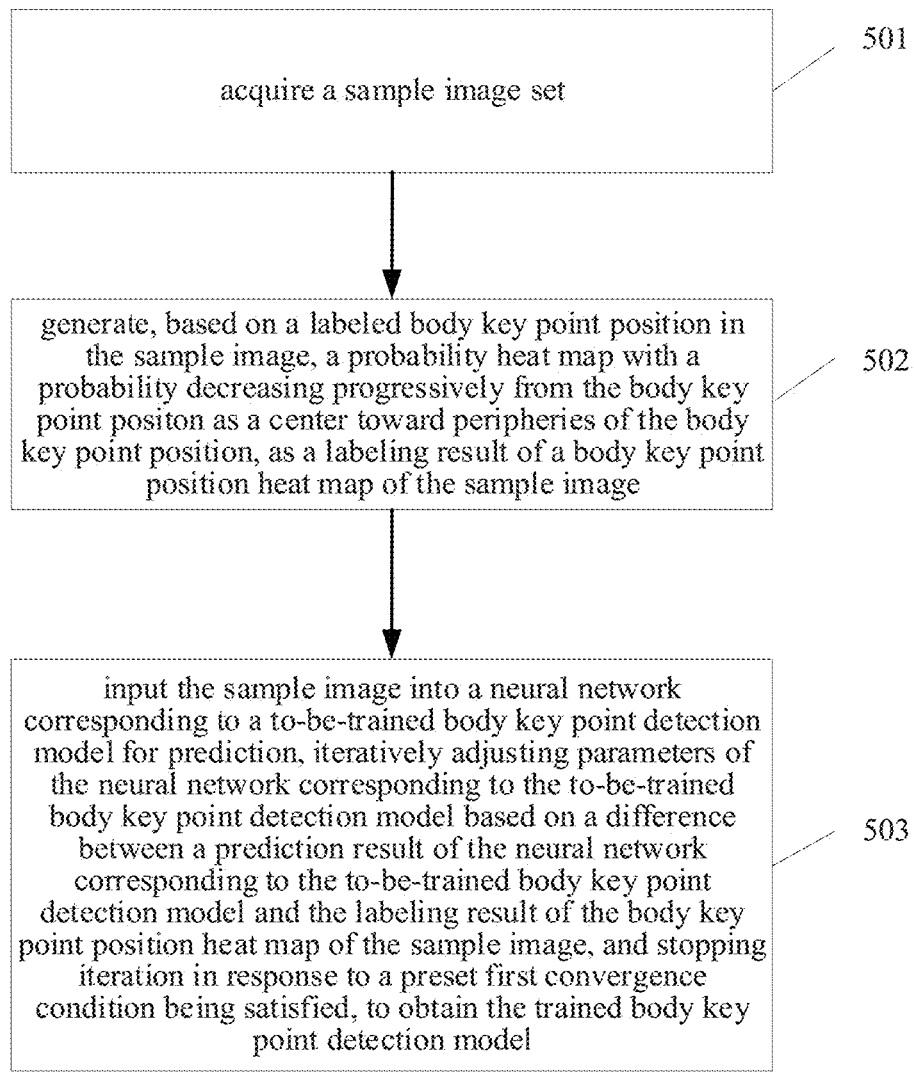
FIG. 5 is a flowchart of a specific implementation of training a body key point detection model in the method for recognizing a body movement according to the present disclosure.
Figure 6:
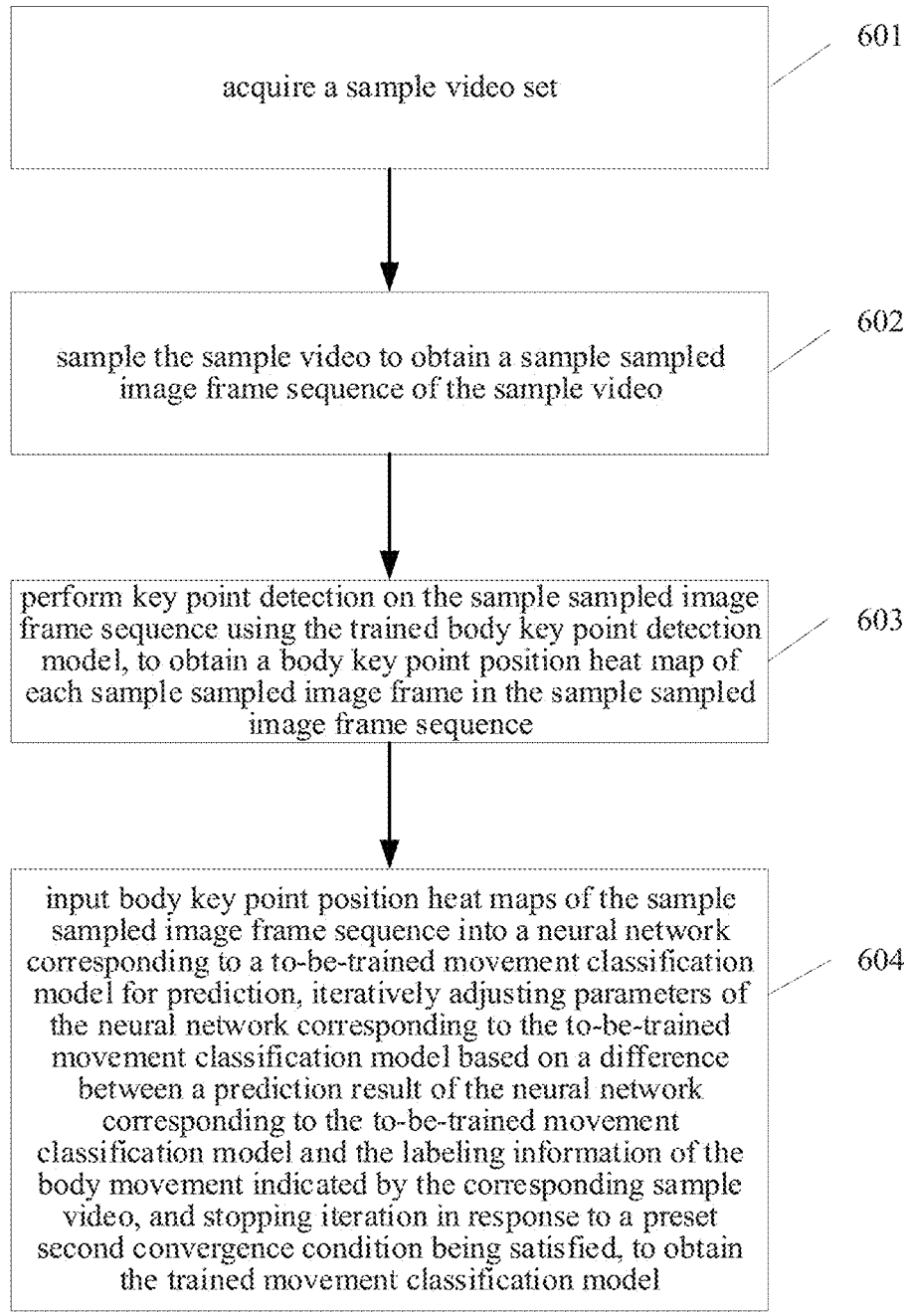
FIG. 6 is a flowchart of a specific implementation of training a movement classification model in the method for recognizing a body movement according to the present disclosure.

Specifically, with further reference to FIG. 5 and FIG. 6, which respectively show a flowchart of a specific implementation of training to obtain a body key point detection model based on a labeled sample image set in the method for recognizing a body movement according to the present disclosure and a flowchart of a specific implementation of training to obtain a movement classification model based on a labeled sample video set in the method for recognizing a body movement according to the present disclosure.

As shown in FIG. 5, a flow 500 of the method of training to obtain a body key point detection model based on a labeled sample image set of the present embodiment includes the following steps:

Step 501, acquiring a sample image set.

The sample image set may include a sample image and labeling information of a body key point position in the sample image. In practice, an image containing a body object may be selected as a sample image, body key points in the sample image are labeled, and then the coordinates of the body key points in the image are calculated and then served as labeling information of the body key point positions in the sample image. In the present embodiment, sample images labeled with position information of the body key points contained therein may be acquired to construct a sample image set, or a large number of sample images may be first selected to construct a sample image set, and then the labeling information obtained by labeling the sample images in the sample image set may be acquired.

Step 502, generating, based on a labeled body key point position in the sample image, a probability heat map with a probability decreasing progressively from the body key point position as a center toward peripheries of the body key point position, as a labeling result of a body key point position heat map of the sample image.

Subsequently, according to the position of a body key point labeled in the sample image, a key point position probability heat map with a probability decreasing progressively from the body key point position as a center toward peripheries of the body key point position is generated around the body key point. The probability value at the position of the labeled body key point in the probability heat map is the highest, and the probability value is gradually decreasing from the labeled body key point toward the peripheries. In this way, a corresponding probability heat map may be generated for each labeled body key point. Alternatively, the generated probability heat map may satisfy the Gaussian distribution. The generated probability heat map of the body key point may be used as the labeling result of the corresponding body key point position heat map in the sample image.

Step 503, inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

After acquiring the labeling result of the corresponding body key point position heat map in the sample image, the sample image may be input into a neural network corresponding to a to-be-trained body key point detection model for prediction. The neural network corresponding to the to-be-trained body key point detection model is used to predict the positions of the body key points in the sample image, to obtain a prediction result of the body key point position heat map of the sample image. Then, a first loss function may be constructed based on the difference between the prediction result of the body key point position heat map of the sample image and the labeling result of the body key point position heat map of the sample image, and whether the value of the first loss function reaches a preset first convergence value is judged. If the value of the first loss function does not reach the preset first convergence value, a back propagation algorithm may be used to iteratively adjust the parameters of the neural network corresponding to the to-be-trained body key point detection model. Then, the body key point detection model with adjusted parameters may be used to re-predict the positions of the body key points in the sample image to obtain a new prediction result of the body key point position heat map of the sample image. Then, whether a preset first convergence condition is satisfied is judged. Specifically, whether the value of the first loss function reaches the preset first convergence value and/or whether the number of iterations reaches a preset first number is judged. If the value of the loss function reaches the preset first convergence value and/or the number of iterations reaches the preset first number, that is, the preset first convergence condition is satisfied, the iteration may be stopped, and the parameters of the neural network corresponding to the body key point detection model are fixed, the trained body key point detection model is obtained. If the preset first convergence condition is not satisfied, the back propagation algorithm may be used to continue to adjust the parameters of the neural network corresponding to the to-be-trained body key point detection model, until the first convergence condition is satisfied after the iteration, and then the trained body key point detection model is output.

As shown in FIG. 6, a method flow 600 of training to obtain a movement classification model based on a labeled sample video set of the present embodiment includes the following steps:

Step 601, acquiring a sample video set.

The sample video set includes a sample video and labeling information of a body movement indicated by the sample video. In practice, a sample video containing a body movement may be acquired, and the body movement in the sample video is labeled to generate body movement labeling information of the sample video. For example, a video containing a body movement may be recorded, or a video containing a body movement may be selected from a network video resource library as the sample video, and the body movement indicated by the sample video is manually labeled.

Step 602, sampling the sample video to obtain a sample sampled image frame sequence of the sample video.

In the present embodiment, the sample video may be sampled by using the same sampling method as of the to-be-recognized video, and a plurality of frames of the sample sampled image may be extracted from the sample video to form a sample sampled image frame sequence.

In some alternative implementations of the present embodiment, a TSN algorithm may be used to sample the sample video to form a sample sampled image frame sequence. Specifically, the sample video may be divided into a plurality of video segments, for example, may be evenly divided into a plurality of video segments. Then, one frame may be randomly selected from each video segment as a sampled image frame of the video segment, and the sampled image frames selected in the entire sample video form the sample sampled image frame sequence.

Step 603, performing key point detection on the sample sampled image frame sequence using the trained body key point detection model, to obtain a body key point position heat map of each sample sampled image frame in the sample sampled image frame sequence.

In the present embodiment, the sample sampled image frame sequence may be input into the trained body key point detection model for key point detection, and a body key point position heat map of each sample sampled image frame is obtained. The body key point position heat map is used to represent a probability feature of the position of a preset body key point. In the body key point position heat map, the pixel value of each pixel point indicates the probability of the key point being at the corresponding position. The body key point may be a preset key point, and may be, for example, a predetermined joint point related to body movement, such as a shoulder joint, an elbow joint, a wrist joint, a hip joint, a knee joint, or an ankle joint. Here, the body key point detection model may be a model constructed based on a deep neural network, and may be, for example, a model constructed based on CNN or RNN or the like. The body key point detection model may be obtained by training using the method flow shown in FIG. 5.

Step 604, inputting the body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

Then, body key point position heat maps of the sample image frame sequence corresponding to the sample video may be input into the neural network corresponding to the to-be-trained movement classification model, to obtain a prediction result of the body movement corresponding to the sample image frame sequence. Then, the prediction result of the neural network corresponding to the to-be-trained movement classification model and the labeling information of the body movement indicated by the corresponding sample video are compared, and a second loss function may be constructed based on the difference between the two to calculate the value of the second loss function. Then, whether the value of the second loss function reaches a preset second convergence value is judged. If the value of the second loss function does not reach the preset second convergence value, a back propagation algorithm may be used to iteratively adjust the parameters of the neural network corresponding to the to-be-trained movement classification model. Then, the movement classification model with adjusted parameters may be used to re-predict the body movement of the sample sampled image frame sequence, to obtain a new prediction result of the body movement of the sample sampled image frame sequence. Then, whether the preset second convergence condition is satisfied is judged. Specifically, whether the value of the second loss function reaches the preset second convergence value and/or whether the number of iterations reaches a preset second number is judged. If the value of the second loss function reaches the preset second convergence value and/or the number of iterations reaches the preset second number, that is, the preset second convergence condition is satisfied, the iteration may be stopped, and the parameters of the neural network corresponding to the movement classification model are fixed, and then the trained movement classification model is obtained. If the preset second convergence condition is not satisfied, a back propagation algorithm may be used to continue to adjust the parameters of the neural network corresponding to the to-be-trained movement classification model, until the second convergence condition is satisfied after the iteration, and then the trained movement classification model is output.

In some alternative implementations of the present embodiment, the flow 600 of training to obtain a movement classification model based on a labeled sample video set may further include the following steps:

extracting a body region from image frames of the sample video, performing a zoom operation of a preset zoom factor and/or a translation operation of a preset translation distance on the body region to generate a simulated sample video, and acquiring labeling information of a body movement indicated by the simulated sample video and adding the simulated sample video to the sample video set.

That is, the body region may be extracted from image frames of the sample video based on the edge feature, the color feature, and the like of the body region, and the body region may be zoomed and/or translated to form a new image. Here, the zoom factor and the translation distance may be preset factor and distance, for example, zooming in 2 times, translating 100 pixel widths in the image edge direction, and the like. The zoom factor and the translation distance may also be determined according to the proportion and the relative position of the body region in the image. For example, when the body region accounts for less than one-third of the image, the body region may be enlarged by at least one time according to a preset zoom factor table; when the body region is located at the edge of the image, the body region is translated by a distance of 0.5 times of the image width or length to move the body region to an intermediate position of the image. The images generated after zooming and/or translating the body region are then combined to generate a simulated sample video in a chronological order of the corresponding original images. The labeling information obtained by labeling the body movement in the simulated sample video is acquired, and then the simulated sample video may be added to the sample video set. In this way, it is ensured that the sample video set includes bodies of various sizes and at various positions, and the robustness of the movement classification model obtained by the training can be enhanced.

Further and alternatively, in the above zooming operation, after the body region is reduced or enlarged, excess pixel positions may be filled with blank pixels, that is, the newly generated pixels may be filled with pixel values of 0 or 255. Similarly, after the translation operation, the pixels of the position where the body region is located before the translation may be filled with the same.

After applying the model training method described above in conjunction with FIG. 5 and/or FIG. 6, the method for recognizing a body movement of the embodiments of the present disclosure may train a reliable body key point detection model and/or an movement classification model based on sample data. Moreover, since the sample data during the training process and the actual to-be-recognized video when using the model for prediction are subjected to the same or similar processing. For example, the sample video is sampled while the to-be-recognized video is also sampled, and for another example, the body key point labeling information of the sample image is processed to generate a labeling result of the body key point position heat map of the sample image. The consistency between the sample data and the data targeted by the actual prediction process is maintained, and the sample data has good randomness, making the trained model have higher accuracy in the processing of the to-be-recognized video.

Figure 7:
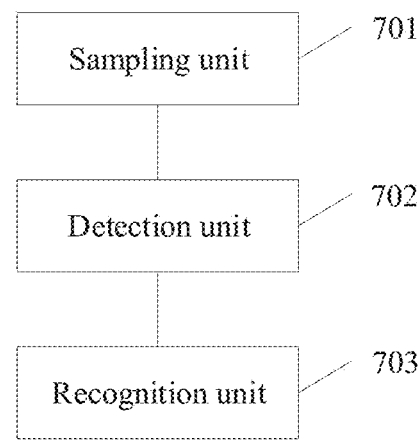
FIG. 7 is a schematic structural diagram of an apparatus for recognizing a body movement according to an embodiment of the present disclosure.

With further reference to FIG. 7, as an implementation of the method shown in the above figures, the present disclosure provides an embodiment of an apparatus for recognizing a body movement, and the apparatus embodiment corresponds to the method embodiment as shown in FIGS. 2-6, and the apparatus may be specifically applied to various electronic devices.

As shown in FIG. 7, the apparatus 700 for recognizing a body movement of the present embodiment includes: a sampling unit 701, a detection unit 702 and a recognition unit 703. The sampling unit 701 may be configured to sample an input to-be-recognized video to obtain a sampled image frame sequence of the to-be-recognized video. The detection unit 702 may be configured to perform key point detection on the sampled image frame sequence by using a trained body key point detection model, to obtain a body key point position heat map of each sampled image frame in the sampled image frame sequence, the body key point position heat map being used to represent a probability feature of a position of a preset body key point. The recognition unit 703 may be configured to input body key point position heat maps of the sampled image frame sequence into a trained movement classification model to perform classification, to obtain a body movement recognition result corresponding to the to-be-recognized video.

In some embodiments, the sampling unit 701 may be further configured to sample an input to-be-recognized video to obtain a sampled image frame sequence of the to-be-recognized video as follows: dividing the input to-be-recognized video into a plurality of video segments, extracting one image frame from each video segment as a sampled image frame of the video segment, and generating the sampled image frame sequence of the to-be-recognized video based on respective sampled image frames of the video segments.

In some embodiments, the recognition unit 703 may be further configured to input the body key point position heat map of the sampled image frame sequence into a trained movement classification model for classification to obtain a body movement recognition result corresponding to the to-be-recognized video as follows: inputting body key point position heat maps of the respective sampled image frames in the sampled image frame sequence into an image feature extraction network of the trained movement classification model, to extract body key point position feature maps of the sampled image frame sequence; inputting the body key point position feature maps of the sampled image frame sequence into a movement feature extraction network of the trained movement classification model, to obtain a movement feature corresponding to the sampled image frame sequence; and performing, based on the movement feature corresponding to the sampled image frame sequence, classification on a body movement indicated by the to-be-recognized video corresponding to the sampled image frame sequence, to obtain the body movement recognition result of the to-be-recognized video.

In some embodiments, the apparatus 700 may further include: a first training unit, configured to train to obtain the body key point detection model based on a labeled sample image set as follows: acquiring a sample image set, where the sample image set includes a sample image and labeling information of a body key point position in the sample image; generating, based on a labeled body key point position in the sample image, a probability heat map with a probability decreasing progressively from the body key point position as a center toward peripheries of the body key point position, as a labeling result of a body key point position heat map of the sample image; and inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

In some embodiments, the apparatus 700 may further include: a second training unit, configured to train to obtain the movement classification model based on a labeled sample video set as follows: acquiring a sample video set, where the sample video set includes a sample video and labeling information of a body movement indicated by the sample video; sampling the sample video to obtain a sample sampled image frame sequence of the sample video; performing key point detection on the sample sampled image frame sequence using the trained body key point detection model, to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

In some embodiments, the second training unit is further configured to: extract a body region from image frames of the sample video, perform a zoom operation of a preset zoom factor and/or a translation operation of a preset translation distance on the body region to generate a simulated sample video, and acquire labeling information of a body movement indicated by the simulated sample video and add the simulated sample video to the sample video set.

It should be understood that the units described in the apparatus 700 correspond to the various steps in the method described with reference to FIGS. 2-6. Thus, the operations and features described for the method are equally applicable to the apparatus 700 and the units contained therein, and detailed description thereof will be omitted.

The apparatus 700 for recognizing a body movement of the above embodiment of the present disclosure, the sampling unit samples an input to-be-recognized video to obtain a sampled image frame sequence of the to-be-recognized video, then the detection unit performs key point detection on the sampled image frame sequence by using a trained body key point detection model to obtain a body key point position heat map of each sampled image frame in the sampled image frame sequence, the body key point position heat map being used to represent a probability feature of a position of a preset body key point, and then the recognition unit inputs the body key point position heat maps of the sampled image frame sequence into a trained movement classification model to perform classification to obtain a body movement corresponding to the to-be-recognized video, thereby realizing a movement recognition using the coordination relationship of body key points in a to-be-recognized video and the time continuity characteristic of body movements, which is beneficial to improving the recognition accuracy.

Figure 8:
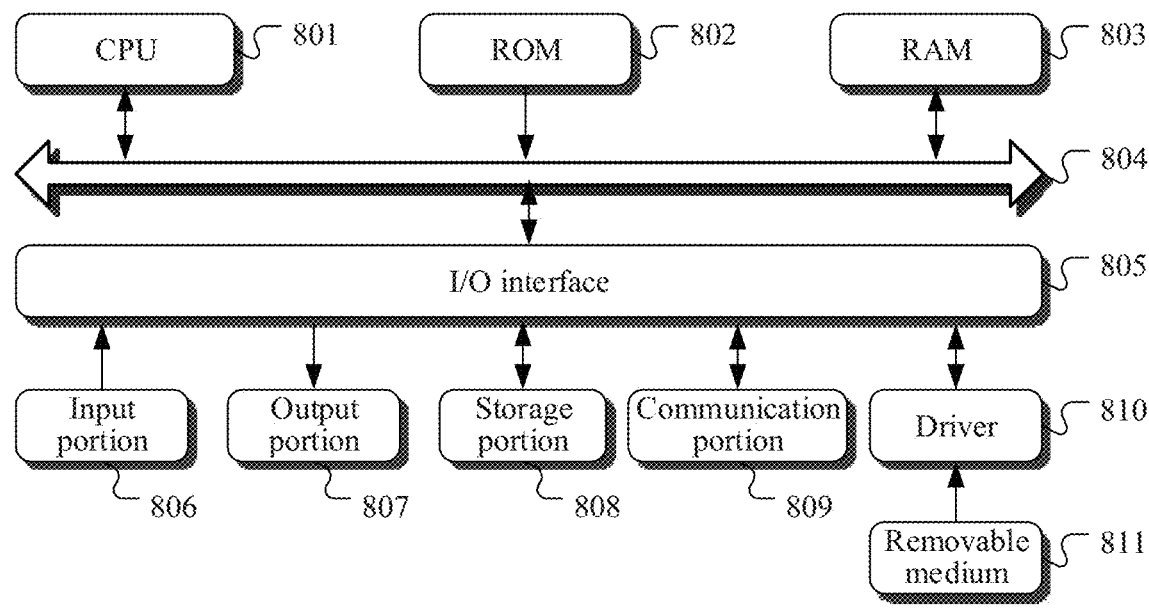
FIG. 8 is a schematic structural diagram of a computer system adapted to implement an electronic device of the embodiments of the present disclosure.

With further reference to FIG. 8, a schematic structural diagram of a computer system 800 adapted to implement an electronic device of the embodiments of the present disclosure is shown. The electronic device shown in FIG. 8 is merely an example, and should not impose any limitation on the function and scope of use of the embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse, etc.; an output portion 807 including such as a cathode ray tube (CRT), a liquid crystal display device (LCD), a speaker, etc.; a storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 809, and/or may be installed from the removable medium 811. The computer program, when executed by the central processing unit (CPU) 801, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a sampling unit, a detection unit and a recognition unit. Here, the names of these units do not in some cases constitute limitations to such units themselves. For example, the sampling unit may also be described as "a unit for sampling an input to-be-recognized video to obtain a sampled image frame sequence of the to-be-recognized video".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: sample an input to-be-recognized video to obtain a sampled image frame sequence of the to-be-recognized video; perform key point detection on the sampled image frame sequence by using a trained body key point detection model, to obtain a body key point position heat map of each sampled image frame in the sampled image frame sequence, the body key point position heat map being used to represent a probability feature of a position of a preset body key point; and input the body key point position heat maps of the sampled image frame sequence into a trained movement classification model to perform classification, to obtain a body movement corresponding to the to-be-recognized video.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for recognizing a body movement, the method comprising:
    sampling an input to-be-recognized video to obtain a sampled image frame sequence of the to-be-recognized video, wherein the sampled image frame sequence comprises a plurality of sampled image frames sorted by time;
    performing key point detection on the sampled image frame sequence by using a trained body key point detection model, to obtain a body key point position heat map of each sampled image frame in the sampled image frame sequence, wherein a pixel value of each pixel point in the body key point position heat map indicates a probability of a body key point being located at a position corresponding to the each pixel point; and
    inputting body key point position heat maps of the plurality of sampled image frames in the sampled image frame sequence into a trained movement classification model to perform classification, to obtain a body movement recognition result corresponding to the to-be-recognized video, wherein the trained movement classification model comprises an image feature extraction network and a movement feature extraction network, the image feature extraction network is configured to extract body key point position feature maps of the sampled image frame sequence from the body key point position heat maps of the plurality of sampled image frames in the sampled image frame sequence, and the movement feature extraction network is configured to obtain, from the body key point position feature maps of the sampled image frame sequence, a movement feature comprising spatial dimension feature information and time dimension feature information.

2. The method according to claim 1, wherein the sampling an input to-be-recognized video to obtain a sampled image frame sequence of the to-be-recognized video comprises:
    dividing the input to-be-recognized video into a plurality of video segments, extracting one image frame from each video segment as a sampled image frame of the video segment, and generating the sampled image frame sequence of the to-be-recognized video based on respective sampled image frames of the video segments.

3. The method according to claim 1, wherein the inputting body key point position heat maps of the sampled image frame sequence into a trained movement classification model to perform classification, to obtain a body movement recognition result corresponding to the to-be-recognized video comprises:
    inputting body key point position heat maps of the respective sampled image frames in the sampled image frame sequence into the image feature extraction network of the trained movement classification model, to extract the body key point position feature maps of the sampled image frame sequence;
    inputting the body key point position feature maps of the sampled image frame sequence into the movement feature extraction network of the trained movement classification model, to obtain the movement feature corresponding to the sampled image frame sequence; and
    performing, based on the movement feature corresponding to the sampled image frame sequence, classification on a body movement indicated by the to-be-recognized video corresponding to the sampled image frame sequence, to obtain the body movement recognition result of the to-be-recognized video.

4. The method according to claim 1, the method further comprising:
    training to obtain the body key point detection model based on a labeled sample image set, comprises:
    acquiring a sample image set, wherein the sample image set comprises a sample image and labeling information of a body key point position in the sample image;
    generating, based on a labeled body key point position in the sample image, a probability heat map with a probability decreasing progressively from the body key point position as a center toward peripheries of the body key point position, as a labeling result of a body key point position heat map of the sample image; and
    inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

5. The method according to claim 1, the method further comprising:
    training to obtain the movement classification model based on a labeled sample video set, comprises:
    acquiring a sample video set, wherein the sample video set comprises a sample video and labeling information of a body movement indicated by the sample video;
    sampling the sample video to obtain a sample sampled image frame sequence of the sample video;
    performing key point detection on the sample sampled image frame sequence using the trained body key point detection model, to obtain a body key point position heat map of each sample sampled image frame in the sample sampled image frame sequence; and
    inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

6. The method according to claim 2, the method further comprising:
training to obtain the movement classification model based on a labeled sample video set, comprises:
acquiring a sample video set, wherein the sample video set comprises a sample video and labeling information of a body movement indicated by the sample video;
sampling the sample video to obtain a sample sampled image frame sequence of the sample video;
performing key point detection on the sample sampled image frame sequence using the trained body key point detection model, to obtain a body key point position heat map of each sample sampled image frame in the sample sampled image frame sequence; and
inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

7. The method according to claim 5, wherein the training to obtain the movement classification model based on a labeled sample video set, further comprises:
extracting a body region from image frames of the sample video, performing a zoom operation of a preset zoom factor and/or a translation operation of a preset translation distance on the body region to generate a simulated sample video, and acquiring labeling information of a body movement indicated by the simulated sample video and adding the simulated sample video to the sample video set.

8. An apparatus for recognizing a body movement, the apparatus comprising:
at least one processor; and
a memory storing instructions, the instructions when executed by the at least one processor, cause the at least one processor to perform operations, the operations comprising:
sampling an input to-be-recognized video to obtain a sampled image frame sequence of the to-be-recognized video, wherein the sampled image frame sequence comprises a plurality of sampled image frames sorted by time;
performing key point detection on the sampled image frame sequence by using a trained body key point detection model, to obtain a body key point position heat map of each sampled image frame in the sampled image frame sequence, wherein a pixel value of each pixel point in the body key point position heat map indicates a probability of a body key point being located at a position corresponding to the each pixel point; and
inputting body key point position heat maps of the plurality of sampled image frames in the sampled image frame sequence into a trained movement classification model to perform classification, to obtain a body movement recognition result corresponding to the to-be-recognized video, wherein the trained movement classification model comprises an image feature extraction network and a movement feature extraction network, the image feature extraction network is configured to extract body key point position feature maps of the sampled image frame sequence from the body key point position heat maps of the plurality of sampled image frames in the sampled image frame sequence, and the movement feature extraction network is configured to obtain, from the body key point position feature maps of the sampled image frame sequence, a movement feature comprising spatial dimension feature information and time dimension feature information.

9. The apparatus according to claim 8, wherein the sampling an input to-be-recognized video to obtain a sampled image frame sequence of the to-be-recognized vide comprises:
dividing the input to-be-recognized video into a plurality of video segments, extracting one image frame from each video segment as a sampled image frame of the video segment, and generating the sampled image frame sequence of the to-be-recognized video based on respective sampled image frames of the video segments.

10. The apparatus according to claim 8, wherein the inputting body key point position heat maps of the sampled image frame sequence into a trained movement classification model to perform classification, to obtain a body movement recognition result corresponding to the to-be-recognized video comprises:
inputting body key point position heat maps of the respective sampled image frames in the sampled image frame sequence into the image feature extraction network of the trained movement classification model, to extract the body key point position feature maps of the sampled image frame sequence;
inputting the body key point position feature maps of the sampled image frame sequence into the movement feature extraction network of the trained movement classification model, to obtain the movement feature corresponding to the sampled image frame sequence; and
performing, based on the movement feature corresponding to the sampled image frame sequence, classification on a body movement indicated by the to-be-recognized video corresponding to the sampled image frame sequence, to obtain the body movement recognition result of the to-be-recognized video.

11. The apparatus according to claim 8, the operations further comprising:
training to obtain the body key point detection model based on a labeled sample image set as follows:
acquiring a sample image set, wherein the sample image set comprises a sample image and labeling information of a body key point position in the sample image;
generating, based on a labeled body key point position in the sample image, a probability heat map with a probability decreasing progressively from the body key point position as a center toward peripheries of the body key point position, as a labeling result of a body key point position heat map of the sample image; and inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

12. The apparatus according to claim 8, the operations further comprising:

training to obtain the movement classification model based on a labeled sample video set as follows:

acquiring a sample video set, wherein the sample video set comprises a sample video and labeling information of a body movement indicated by the sample video;

sampling the sample video to obtain a sample sampled image frame sequence of the sample video;

performing key point detection on the sample sampled image frame sequence using the trained body key point detection model, to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

13. The apparatus according to claim 9, the operations further comprising:

training to obtain the movement classification model based on a labeled sample video set as follows:

acquiring a sample video set, wherein the sample video set comprises a sample video and labeling information of a body movement indicated by the sample video;

sampling the sample video to obtain a sample sampled image frame sequence of the sample video;

performing key point detection on the sample sampled image frame sequence using the trained body key point detection model, to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

14. The apparatus according to claim 12, wherein the training to obtain the movement classification model based on a labeled sample video set, further comprises:

extracting a body region from image frames of the sample video, performing a zoom operation of a preset zoom factor and/or a translation operation of a preset translation distance on the body region to generate a simulated sample video, and acquiring labeling information of a body movement indicated by the simulated sample video and adding the simulated sample video to the sample video set.

15. A non-transitory computer readable storage medium storing a computer program, wherein the computer program, when executed by a processor, causes the processor to perform operations, the operations comprising:

sampling an input to-be-recognized video to obtain a sampled image frame sequence of the to-be-recognized video, wherein the sampled image frame sequence comprises a plurality of sampled image frames sorted by time;

performing key point detection on the sampled image frame sequence by using a trained body key point detection model, to obtain a body key point position heat map of each sampled image frame in the sampled image frame sequence, wherein a pixel value of each pixel point in the body key point position heat map indicates a probability of a body key point being located at a position corresponding to the each pixel point; and inputting body key point position heat maps of the plurality of sampled image frames in the sampled image frame sequence into a trained movement classification model to perform classification, to obtain a body movement recognition result corresponding to the to-be-recognized video, wherein the trained movement classification model comprises an image feature extraction network and a movement feature extraction network, the image feature extraction network is configured to extract body key point position feature maps of the sampled image frame sequence from the body key point position heat maps of the plurality of sampled image frames in the sampled image frame sequence, and the movement feature extraction network is configured to obtain, from the body key point position feature maps of the sampled image frame sequence, a movement feature comprising spatial dimension feature information and time dimension feature information.

16. The medium according to claim 15, wherein the sampling an input to-be-recognized video to obtain a sampled image frame sequence of the to-be-recognized vide comprises:

dividing the input to-be-recognized video into a plurality of video segments, extracting one image frame from each video segment as a sampled image frame of the video segment, and generating the sampled image frame sequence of the to-be-recognized video based on respective sampled image frames of the video segments.

17. The medium according to claim 15, wherein the inputting body key point position heat maps of the sampled image frame sequence into a trained movement classification model to perform classification, to obtain a body movement recognition result corresponding to the to-be-recognized video comprises:

inputting body key point position heat maps of the respective sampled image frames in the sampled image frame sequence into the image feature extraction network of the trained movement classification model, to extract the body key point position feature maps of the sampled image frame sequence;

inputting the body key point position feature maps of the sampled image frame sequence into the movement feature extraction network of the trained movement classification model, to obtain the movement feature corresponding to the sampled image frame sequence; and performing, based on the movement feature corresponding to the sampled image frame sequence, classification on a body movement indicated by the to-be-recognized video corresponding to the sampled image frame sequence, to obtain the body movement recognition result of the to-be-recognized video.

18. The medium according to claim 15, the operations further comprising:

training to obtain the body key point detection model based on a labeled sample image set, comprises:

acquiring a sample image set, wherein the sample image set comprises a sample image and labeling information of a body key point position in the sample image;

generating, based on a labeled body key point position in the sample image, a probability heat map with a probability decreasing progressively from the body key point position as a center toward peripheries of the body key point position, as a labeling result of a body key point position heat map of the sample image; and inputting the sample image into a neural network corresponding to a to-be-trained body key point detection model for prediction, iteratively adjusting parameters of the neural network corresponding to the to-be-trained body key point detection model based on a difference between a prediction result of the neural network corresponding to the to-be-trained body key point detection model and the labeling result of the body key point position heat map of the sample image, and stopping iteration in response to a preset first convergence condition being satisfied, to obtain the trained body key point detection model.

19. The medium according to claim 15, the operations further comprising:

training to obtain the movement classification model based on a labeled sample video set, comprises:

acquiring a sample video set, wherein the sample video set comprises a sample video and labeling information of a body movement indicated by the sample video;

sampling the sample video to obtain a sample sampled image frame sequence of the sample video;

performing key point detection on the sample sampled image frame sequence using the trained body key point detection model, to obtain a body key point position heat map of each sample sampled image frame in the sample sampled image frame sequence; and inputting body key point position heat maps of the sample sampled image frame sequence into a neural network corresponding to a to-be-trained movement classification model for prediction, iteratively adjusting parameters of the neural network corresponding to the to-be-trained movement classification model based on a difference between a prediction result of the neural network corresponding to the to-be-trained movement classification model and the labeling information of the body movement indicated by the corresponding sample video, and stopping iteration in response to a preset second convergence condition being satisfied, to obtain the trained movement classification model.

20. The medium according to claim 19, wherein the training to obtain the movement classification model based on a labeled sample video set, further comprises:

extracting a body region from image frames of the sample video, performing a zoom operation of a preset zoom factor and/or a translation operation of a preset translation distance on the body region to generate a simulated sample video, and acquiring labeling information of a body movement indicated by the simulated sample video and adding the simulated sample video to the sample video set.

* * * * *